Dec. 21, 1926.                                                  1,611,183
                        W. H. FRASSE
                GRID LEAK AND CONDENSER MOUNTING
                    Filed Dec. 4, 1924

INVENTOR
                                     William H. Frasse
                                   BY
                                     Walter H. Humphrey
                                              ATTORNEY Patented Dec. 21, 1926.

1,611,183

UNITED STATES PATENT OFFICE.

WILLIAM H. FRASSE, OF NEWARK, NEW JERSEY.

GRID LEAK AND CONDENSER MOUNTING.

Application filed December 4, 1924. Serial No. 753,982.

My invention, while not limited in its use, is particularly adapted, as herein embodied, to serve in conveniently mounting the grid leak condenser, now commonly employed in the grid circuit of the detector tube of radio receiving apparatus.

According to present practice, the grid leak of a detector tube is removably held in terminal spring clips of a base of non-conducting material and the condenser is wired, in shunted relation, to the leak, the arrangement, ordinarily, being such as to occupy considerable space and unnecessarily multiply the number of joint or circuit connections.

To avoid the above mentioned objections, it is the object of the present invention to provide for accommodating the condenser between the grid leak and the base on which it is usually mounted, thereby utilizing the grid leak mounting for the performance of the additional function of serving also as a mounting for the condenser, and, at the same time, presenting a compact assembly in which the members or units are snapped into position and removably held in good electrical contact between spring clips, thus doing away with wiring, soldered joints, etc., and reducing the circuit connections to a minimum.

A construction suitable for carrying my invention into effect is illustrated in the accompanying drawings, in which—

Figure 1:
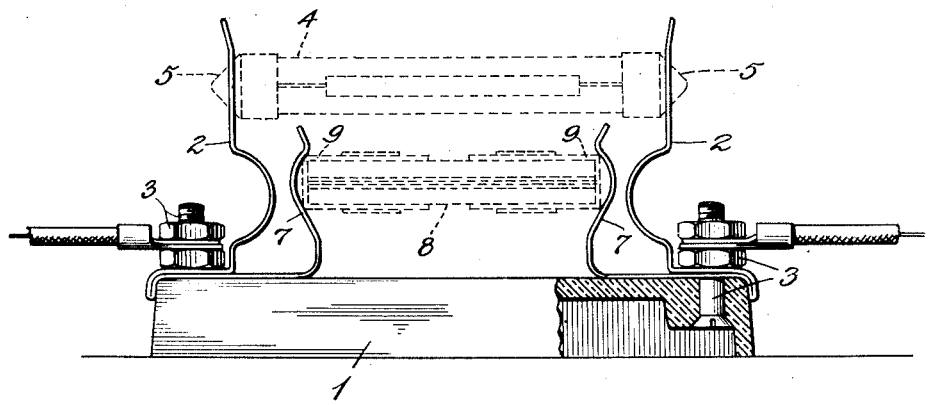
Fig. 1 is a view in perspective of the mounting, showing the grid leak and the condenser in position and connected in multiple relation between the terminal clips of the base.
Figure 2:
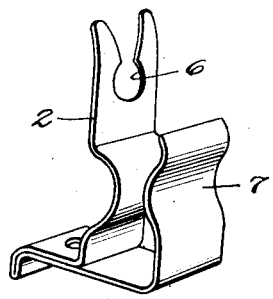
Fig. 2 is a detail perspective view.
Figure 3:
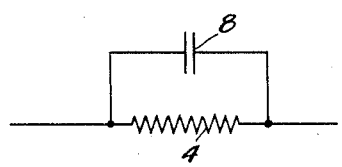
Fig. 3 is a circuit diagram of the connection of the members or units, as provided by the mounting shown in Fig. 1.

Referring now to the drawings, 1 represents a base of any suitable non-conducting material.

At each end of the base, spring clips 2, 2, are secured by bolts and nuts 3, 3, or other suitable means, and, as shaped and spaced, the clips are adapted to receive and hold in clamped relation, a well-known form of grid leak 4.

As shown, the grid leak is provided with cone-shaped metal terminals 5, 5, which enter apertures or slots 6, 6, in the flared ends of the clips, as the leak is snapped or pressed into position.

The clips 2, 2, are preferably formed of spring metal and are sufficiently resilient to hold the leak under constant tension, thus insuring good electrical contact.

Between the grid leak and base, above described, provision is made, by means of an additional pair of clips 7, 7, for mounting the condenser 8.

The clips 7, 7, may be formed as separate members or as extensions of the clips 2, 2, and are designed and adapted to grip and make contact with the metal terminals 9, 9, of the condenser, as the latter is snapped into position between them.

The simplicity, convenience and advantages of the invention will be apparent from the foregoing description.

Having thus described my invention, what I claim is:

1. A grid leak and condenser mounting comprising two spring arms having adjacently positioned portions to engage a condenser and a grid leak respectively, said arms having overlapping base portions positioned to engage a support.

2. A grid leak and condenser mounting comprising a strip of metal bent upon itself to provide a base portion and spaced apart, spring arms positioned to engage a condenser and grid leak respectively.

WILLIAM H. FRASSE.